June 3, 1969   R. DELOIRE   3,447,535
MOUTHPIECE REGULATOR
Filed Oct. 11, 1965   Sheet 1 of 2

United States Patent Office 3,447,535
Patented June 3, 1969

3,447,535
MOUTHPIECE REGULATOR
Raymond Deloire, Vaucresson, France, assignor to
La Spirotechnique
Filed Oct. 11, 1965, Ser. No. 494,503
Claims priority, application France, Nov. 10, 1964,
994,502
Int. Cl. A61h 31/00
U.S. Cl. 128—147                                6 Claims

ABSTRACT OF THE DISCLOSURE

A mouthpiece regulator for breathing apparatus, in which air issuing from an expansion valve flows through a diaphragm-closed expansion chamber toward an aperture in the chamber in order to produce an injector action, then through an intermediate space in which it is damped and finally to the mouthpiece.

---

This invention relates to a mouthpiece regulator for a breathing apparatus of the type in which the stream of breathable gas from the space between the expansion valve and the seat of the said valve is directed towards an aperture in the expansion chamber of the regulator through which the gas leaves the said chamber, so as to produce an injecting action.

By expansion chamber is meant the space inside the regulator where the pressure is approximately the same as the inhaling or exhaling pressure in the mouthpiece into which the regulator feeds the breathable gas, the wall of the said chamber consisting partly of one side of a membrane or similar device, the other side of which is subjected to the pressure of the surrounding medium.

When the wearer inhales, the injecting effect reduces the pressure in the expansion chamber slightly below the inhaling pressure, which makes breathing easier. Unfortunately, this type of regulator gives unpleasant sensations in the mouth, such as its drying, and the stream of gas produces untoward reactions, which vary according to the subject: salivation, vomiting, coughing. It has been found that, the regulator being necessarily very close to the mouth, the stream of gas was not substantially damped before it entered the mouth, hence the above inconveniences.

The regulator according to the invention does not have these drawbacks. Its main feature is that the stream of gas leaving the above-mentioned aperture, save possibly a small fraction of the said stream, does not go in a straight line from the above-mentioned space to the inlet tube of the mouthpiece, but goes through an intermediate space between the said chamber and the said tube, where the stream is diverted, diffuses into the gas contained in the said intermediate space and is damped.

The mouthpiece is the portion of the regulator which the wearer introduces into his mouth; it is fed with breathable gas through one end of its short inlet tube.

The stream of gas having been damped, the above-mentioned sensations and reflexes disappear; nevertheless, breathing remains easy, thanks to the injecting action.

The appended illustrations diagrammatically and by way of example show several embodiments of the invention.

Figure 1:
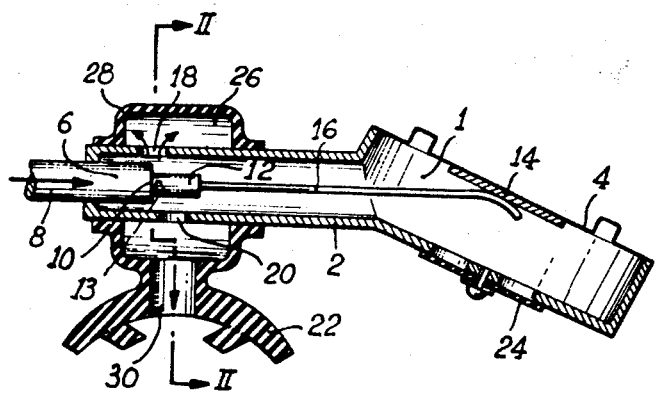
FIG. 1 is a longitudinal section of a regulator according to the invention along line I—I of FIG. 2.
Figure 2:
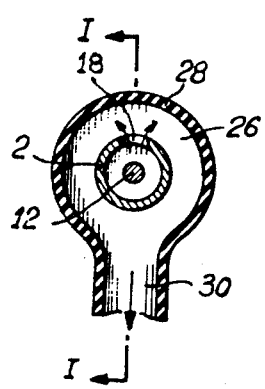
FIG. 2 is a transverse section of the same regulator along line II—II of FIG. 1.

In the regulator shown in FIGS. 1 and 2, the chamber 1 of the regulator is defined mainly by body 2. One portion of the chamber wall consists of one face (the lower face in FIG. 1) of a diaphragm 4, the other side of which is in contact with, or at least at approximately the same pressure as, the surrounding medium.

One end of the expanding chamber, the left end of FIG. 1, carries an expansion valve block 6. The breathable gas enters through inlet tube 8 of block 6; when the wearer inhales, the gas escapes into the expansion chamber through the space between valve seat 10 and valve 12. FIG. 1 shows in dotted lines 13 the position of maximum opening of the surface of the valve which was in contact with the seat. The valve is tipped open when, under the action of a depression in chamber 1, diaphragm 4 is sucked into the chamber and presses, through reinforcing plate 14, upon stem 16, integral with the valve.

Figure 6:
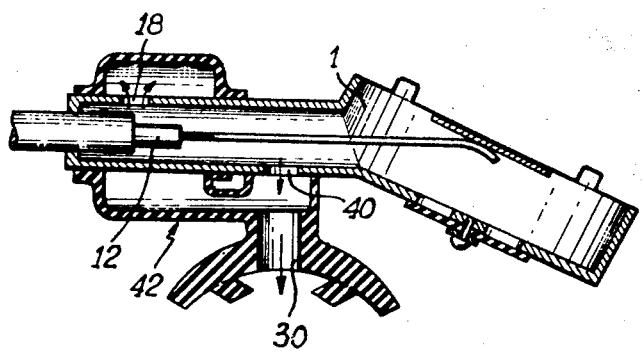
FIG. 6 is a longitudinal section of yet another regulator according to the invention.

To simplify the drawing, the guide of valve 12 is not shown; this guide may for instance be of one of the types described in French Patent No. 1,402,101 of Apr. 29, 1964, for a "Demand Regulator in Which the Diaphragm Tips the Valve." The same holds for FIG. 6 of the instant patent application.

A major portion of the stream of gas then issuing from between the valve and valve seat is directed towards aperture 18 in the wall of body 2, through which aperture part of the gas in chamber 1 is sucked; this suction, called "injecting action," amplifies the movement of the diaphragm and reduces the inhaling effort to be made by the wearer. Various means may be used to prevent the effect of the injecting action from being too large: in the instance shown, a portion only of the stream is directed towards aperture 18; moreover, another aperture 20 has been provided in body 2. Aperture 20 is located at a point towards which the air stream from the valve is not directed or very little directed; it allows a certain amount of gas, at the pressure in mouthpiece 22, to return to chamber 1, and also allows the discharge through exhaling valve 24 of any water which may have accidentally entered the regulator.

Once the stream of gas has gone through aperture 18, it diffuses into the gas already present in ring-shaped intermediate space 26 between body 2 and casing 28. Once diffused and damped, the gas stream goes through tube 30 and the mouthpiece into the mouth of the wearer.

Figure 3:
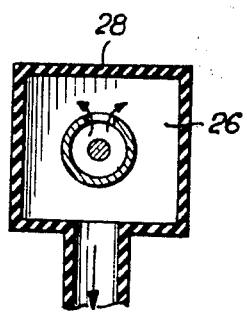
FIG. 3 is a transverse section of a first variation of the regulator.
Figure 4:
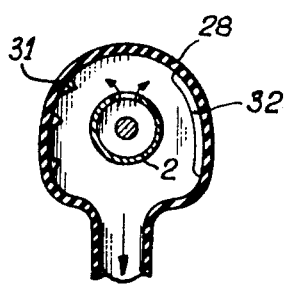
FIG. 4 is a transverse section of a second variation of the regulator.

Various means may be used to enhance the diffusion and damping. Space 26 may be given an angular shape (FIG. 3). The walls of space 26 may also be provided with irregular or geometric means such as reliefs, ribs, grooves, bosses or the like; the left half of FIG. 4 shows longitudinal ribs 31, the right half shows transverse ribs 32. Ribs of both kinds, oblique ribs, truncated conical bosses, hemispherical bosses, cylindrical bosses or the like may also be used.

The gas stream may be diffused into other intermediate spaces than an annular intermediate space such as shown on FIGS. 1–4; for instance, a portion of the annular space may be omitted.

Figure 5:
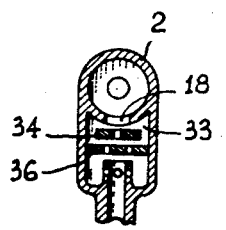
FIG. 5 is a transverse section of another variation of the regulator.

The gas from aperture 18 may also, as shown on FIG. 5, be led through space 33 where baffles impede the flow. Such baffles may be for instance perforated screens 34, 36, small-mesh wire screens, and the like.

FIG. 6 shows a regulator in which the underpressure due to inhaling is transmitted from the mouthpiece to chamber 1 through aperture 40, which does not face valve 12. Tube 30 of the mouthpiece opens in front of and in general alignment with aperture 40, but might be located elsewhere and not receive directly the stream from aperture 40, for instance in the location shown by arrow 42.

Figure 8:
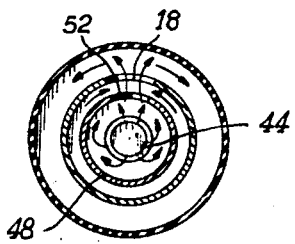
FIG. 8 is a section along line VIII—VIII of FIG. 7.
Figure 7:
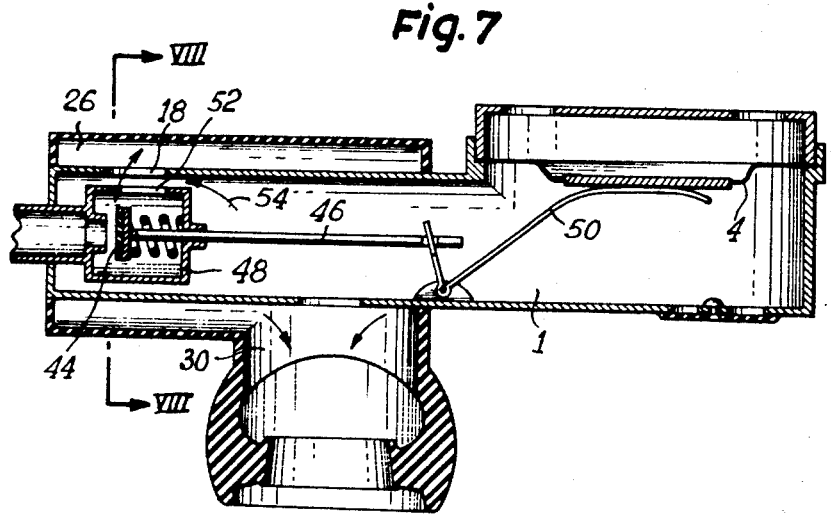
FIG. 7 is a longitudinal section of a further regulator according to the invention.

The valve of the regulator may be of a non-tipping type. FIGS. 7 and 8 show a regulator with a straight-movement valve: valve 44 is held by rod 46, guided by a bearing provided in box 48 and linked to crank lever 50, actuated by diaphragm 4.

The stream of air issuing from box 48 through aperture 52 carries along, by injecting action, some air from chamber 1, as shown by arrow 54; it then goes through aperture 18 into the annular chamber 26, where it diffuses before issuing through tube 30.

What I claim is:

1. A mouthpiece regulator for a breathing apparatus, comprising a casing defining an expansion chamber, a mouthpiece, means defining a damping chamber surrounding a portion of said expansion chamber and extending at least over a major portion of the periphery of said expansion chamber and communicating with said mouthpiece, said expansion chamber communicating with said damping chamber through an aperture directed away from said mouthpiece, an expansion valve for admitting breathable gas into the expansion chamber, said valve directing said gas toward said aperture, said expansion chamber having a movable wall portion subjected on its inner side to the pressure in the expansion chamber and on its outer side to the ambient pressure, and means interconnecting the valve and the movable wall portion to open the valve upon movement of the movable wall portion into the expansion chamber.

2. A regulator as set forth in claim 1, in which the internal wall of the damping chamber is provided with means such as reliefs, ribs, grooves or bosses.

3. A regulator as set forth in claim 1, in which the internal wall of the damping chamber forms re-entrant angles.

4. A regulator as set forth in claim 1, in which baffles impede the passage of the breathable gas through the said damping chamber.

5. A regulator as set forth in claim 4, in which said baffles are perforated.

6. A regulator as set forth in claim 1, wherein said damping chamber has an annular configuration.

References Cited

UNITED STATES PATENTS

| | | | |
|---|---|---|---|
| 2,747,572 | 5/1956 | Gagnan | 128—147 |
| 2,886,033 | 5/1959 | Gagnan et al. | 128—147 |
| 2,894,506 | 7/1959 | Rose | 128—147 |
| 3,101,732 | 8/1963 | Dalla Valle | 128—147 |

FOREIGN PATENTS

| | | |
|---|---|---|
| 1,355,755 | 2/1964 | France. |
| 913,950 | 12/1962 | Great Britain. |

RICHARD A. GAUDET, *Primary Examiner.*

K. L. HOWELL, *Assistant Examiner.*